J. E. WILSON.
METHOD OF MAKING LOCK NUT WASHERS.
APPLICATION FILED APR. 20, 1909.
949,871.
Patented Feb. 22, 1910.
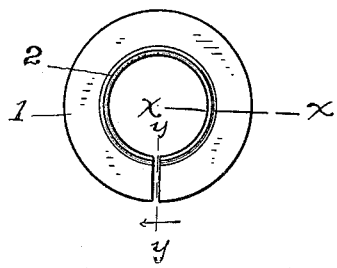
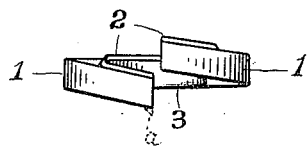
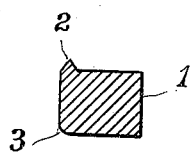
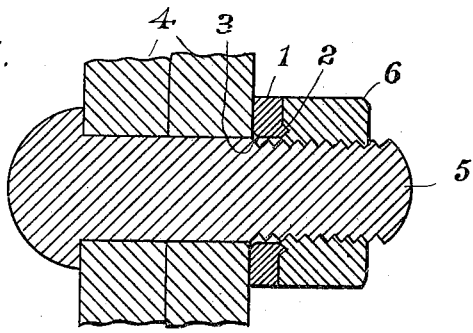
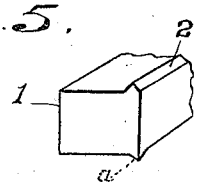
WITNESSES:
INVENTOR
Jas. E. Wilson.
BY
ATTORNEY

UNITED STATES PATENT OFFICE.

JAMES E. WILSON, OF NEW YORK, N. Y., ASSIGNOR TO NATIONAL LOCK WASHER CO., OF NEWARK, NEW JERSEY, A CORPORATION OF NEW JERSEY.

METHOD OF MAKING LOCK-NUT WASHERS.

949,871.  Specification of Letters Patent.  Patented Feb. 22, 1910.

Application filed April 20, 1909. Serial No. 491,074.

*To all whom it may concern:*

Be it known that I, JAMES E. WILSON, a citizen of the United States, residing at New York, in the county of New York and State of New York, have invented certain new and useful Improvements in Methods of Making Lock-Nut Washers; and I do hereby declare the following to be a full, clear, and exact description of the invention, such as will enable others skilled in the art to which it appertains to make and use the same.

My invention relates to method of making lock nut washers, but more particularly has reference to the making of devices of this description which are sections of a cylindrical coil of suitable metal, so that the washer thus formed is, after proper tempering, a "spring washer".

Heretofore the inner edge of the outer face of such spring washers has been slightly elevated so as to form an angular rib, and when such washer was interposed between the nut and the object through which the bolt extended, the nut as it was driven home would gradually depress the washer and at the same time exert a grinding action against the latter, whereby the rib on the washer would cut into the nut and force stock from the latter against the threaded bolt thereby effecting the locking. This method just described of locking a nut, while very effective under favorable conditions, has met with serious drawbacks owing to the imperfect character of the washer itself, and this defect in the washer is due to the fact that a bur on the inner lower edge of the washer is invariably incidental to its manufacture, and when pressure is applied by means of the nut to the washer it will not set evenly on the object through which the bolt extends, and during the grinding movement of the nut, the washer will become strained and in many instances will break thus nullifying its effect as a lock. This defect has been abundantly recognized, and efforts have heretofore been made to cure the same but without material success. For instance, a washer has been constructed with its greatest holding or binding portion at its outer marginal edges, so that any bur on the inner edge will have no contact with the object through which the bolt extends until the nut is finally driven home. Also, the washer has been provided not only with the raised rib on its upper inner edge, but a raised rib has been formed on its lower outer edge in order to overcome this defect. But in these last named constructions a very clumsy washer has resulted and one which is extremely difficult to manufacture owing to the requirement of specially rolled stock, and moreover they are not perfect washers owing to the fact that their locking qualities have been more or less impaired in the endeavor to overcome the defect by the presence of the bur above referred to. I have discovered a very simple remedy for this defect, and my washer as constructed not only overcomes this defect but the locking qualities of the same are unimpaired, and my invention consists in the method of manufacture hereinafter fully explained and then particularly pointed out in the claim which concludes this description.

In the accompanying drawing Figure 1 is a plan view of a washer made in accordance with my method—Fig. 2 a side elevation of the old form of spring washer without the bevel on the rear inner periphery—Fig. 3 a section at the line $x$, $x$, of Fig. 1—Fig. 4 a sectional elevation illustrating my washer in effective position with the nut screwed home, and Fig. 5 a broken perspective view of the end of the old form of washer such as is shown at Fig. 2, showing particularly the appearance and location of the bur defect.

Similar numbers of reference denote like parts in the several figures of the drawing.

1 is the body of my improved spring washer which is in the form of a single sectional convolution of a helix which latter is made from suitably rolled stock.

Projecting upwardly from the inner peripheral edge of the outer face of the washer is a rib which is triangular shaped in cross section, while the corresponding edge of the inner face of said washer is entirely cut away as seen at 3.

In order to produce the washer above described, I employ a strip of suitably rolled stock that has the rib 2 formed thereon along one edge; I then bevel or chamfer the edge of said stock that is immediately opposite the base of the rib 2; I then wind this strip into the form of a coil spring, one of the inner edges of such coil bearing the rib 2 while the other or opposite inner edge is the one that has the bevel; the washers are severed from the coil by a blow which practically breaks them away from said coil, and this blow forces a bur from the stock immediately adjacent the bevel, but said bur will not extend beyond this beveled portion and therefore the rear face of the severed washer, which is the face immediately opposite the face that bears the rib 2, will be perfectly plain, and there will be no part of this lower face on which a rocking movement may be effected when the nut is driven home. This bevel is preferably formed, as just described, on the strip of stock prior to the coiling, but it is obvious that each washer may be beveled successively after coiling and immediately prior to severing, and I do not wish to be limited in this respect.

The manner in which a washer made in accordance with my method is used is illustrated at Fig. 4, where I have shown suitable plates 4 or other objects through which extends a threaded bolt 5, the washer 1 being placed around the bolt with its rear face toward the adjacent plate 4, while a nut 6 is driven on the end of the bolt directly against said washer. As the nut comes in contact with successive portions of the rib 2, the washer will gradually be compressed against the plate 4 while at the same time said rib will cut and grind into the lower face of the nut, and as the pressure of the latter becomes greater, the stock at the inner periphery of the nut will be forced firmly against the bolt and thereby effect a perfect locking. During this operation the washer will gradually be forced flatly and evenly against the face of the plate and there will be an abundance of clearance between this particular cut away portion of the washer and the threads of the bolt, and as there is no point extending beyond the rear face of the washer, the latter cannot rock unevenly, nor is there any semblance of a bur which might accidentally break away and be wedged between the faces of the plate and washer.

I have shown at $a$ in dotted lines at Figs. 2 and 5 the appearance and location of the bur which is the result of the cutting of the old form of washers from the helix, and it will be clear that the cutting away of the rear inner edge of the washers will render such a defect impossible.

My improvement is of course not limited to the provision of any particular shape of cutting rib in cross section, or in fact to the making of washers with these ribs, since the latter have no bearing on my invention proper, and I have shown and described this rib merely since it is present in the style of washer that I prefer to make, but in all instances a washer made by my method must have a perfectly plain rear surface with its inner peripheral edge cut away.

Having thus described my invention what I claim as new and desire to secure by Letters Patent is:—

The herein described method of making spring lock washers, which consists in winding the stock into the form of a coil spring, beveling the edge which forms the inner periphery of the rear faces of the washers, and then successively severing each convolution of said spring.

In testimony whereof I affix my signature in presence of two witnesses.

JAMES E. WILSON.

Witnesses:
ESTHER SLOCUM,
SPAULDING FRAZER.